(12) United States Patent
Anand et al.

(10) Patent No.: US 10,924,420 B2
(45) Date of Patent: *Feb. 16, 2021

(54) MULTI-DIMENSIONAL EVENT ENGINE FOR USE WITH HIGHLY AVAILABLE NETWORK TOPOLOGY

(71) Applicant: Walmart Apollo, LLC, Bentonville, AR (US)

(72) Inventors: Raj Anand, Santa Clara, CA (US); Ruchitkumar A. Shah, Fremont, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/933,840

(22) Filed: Jul. 20, 2020

(65) Prior Publication Data

US 2020/0351210 A1  Nov. 5, 2020

Related U.S. Application Data

(63) Continuation of application No. 15/882,988, filed on Jan. 29, 2018, now Pat. No. 10,721,170.

(51) Int. Cl.
*H04L 12/24* (2006.01)
*H04L 12/801* (2013.01)
*H04L 12/825* (2013.01)
*H04L 12/26* (2006.01)

(52) U.S. Cl.
CPC .............. *H04L 47/25* (2013.01); *H04L 41/12* (2013.01); *H04L 47/12* (2013.01); *H04L 41/0668* (2013.01); *H04L 43/0817* (2013.01); *H04L 43/0876* (2013.01)

(58) Field of Classification Search
CPC ......... H04L 41/12; H04L 47/12; H04L 47/24; H04L 47/25; H04L 47/263; H04L 47/28; H04L 47/787; H04L 41/0668; H04L 43/0817; H04L 43/0876
See application file for complete search history.

(56) References Cited

U.S. PATENT DOCUMENTS

| | | |
|---|---|---|
| 8,620,707 B1 | 12/2013 | Belyi et al. |
| 2005/0237934 A1 | 10/2005 | Mito et al. |
| 2009/0201800 A1 | 8/2009 | Naseh et al. |
| 2011/0118855 A1 | 5/2011 | Hosek et al. |
| 2013/0304826 A1 | 11/2013 | Li et al. |
| 2016/0063604 A1 | 3/2016 | Shaffer et al. |
| 2016/0127247 A1 | 5/2016 | Anzai et al. |

*Primary Examiner* — Melvin C Marcelo
*Assistant Examiner* — Natali Pascual Peguero
(74) *Attorney, Agent, or Firm* — Bryan Cave Leighton Paisner LLP

(57) ABSTRACT

A system including one or more processors and one or more non-transitory computer-readable media storing computing instructions configured to run on the one or more processors and perform initiating a cluster of controller instances for executing a multi-dimensional event engine; configuring the cluster of controller instances in a topology, wherein the topology applies a distributed lock to designate an active controller instance selected from the cluster of controller instances to be utilized as the multi-dimensional event engine; and after configuring the cluster of controller instances, executing the multi-dimensional event engine. Other embodiments are disclosed.

20 Claims, 6 Drawing Sheets

500

510– Detecting a current level of network traffic

520– Receiving messages from an order management system

530– Selecting a transmission rate for sending the messages to one or more fulfillment centers based on the current level of network traffic that is detected

540– Transmitting the messages to the fulfillment centers in accordance with the transmission rate that is selected

550– Dynamically adjusting the transmission rate in response to detecting changes in the network traffic

MULTI-DIMENSIONAL EVENT ENGINE FOR USE WITH HIGHLY AVAILABLE NETWORK TOPOLOGY

CROSS-REFERENCE TO RELATED APPLICATIONS

This application is a continuation of U.S. application Ser. No. 15/882,988 filed Jan. 29, 2018, to be issued as U.S. Pat. No. 10,721,170. U.S. application Ser. No. 15/882,988 is incorporated herein by reference in its entirety.

TECHNICAL FIELD

This disclosure relates generally to multi-dimensional event engines that are configured to auto-adjust transmission rates of message events that are communicated to fulfillment centers, and that are incorporated into highly available and redundant network topologies to ensure continuous operations and to minimize system downtime.

BACKGROUND

The logistics of managing multiple fulfillment centers can be very complex. A single fulfillment center can be expected to process, package, and prepare massive volumes of orders each day (e.g., thousands of orders each day). In addition to receiving and processing newly received orders, the fulfillment center must account for order cancellations and prioritized shipping requirements (e.g., for orders that must be delivered within short time periods). The fulfillment center also must carefully manage inventory levels to ensure that the received orders are able to be fulfilled.

The manner in which conventional systems relay event information (e.g., events related to new orders, cancellations and inventory updates) to fulfillment centers is inefficient and does not account for varying volumes of requests during peak and non-peak hours. Moreover, these conventional systems fail to provide proper redundancies to ensure that the system does not experience downtime. If the systems becomes unavailable or crashes, it can cause shipping delays, inaccuracies in inventory tracking, and/or a variety of delivery problems (e.g., losing track of packages).

BRIEF DESCRIPTION OF THE DRAWINGS

To facilitate further description of the embodiments, the following drawings are provided in which:

FIG. 5 is a flowchart for a method according to certain embodiments; and

Figure 1:
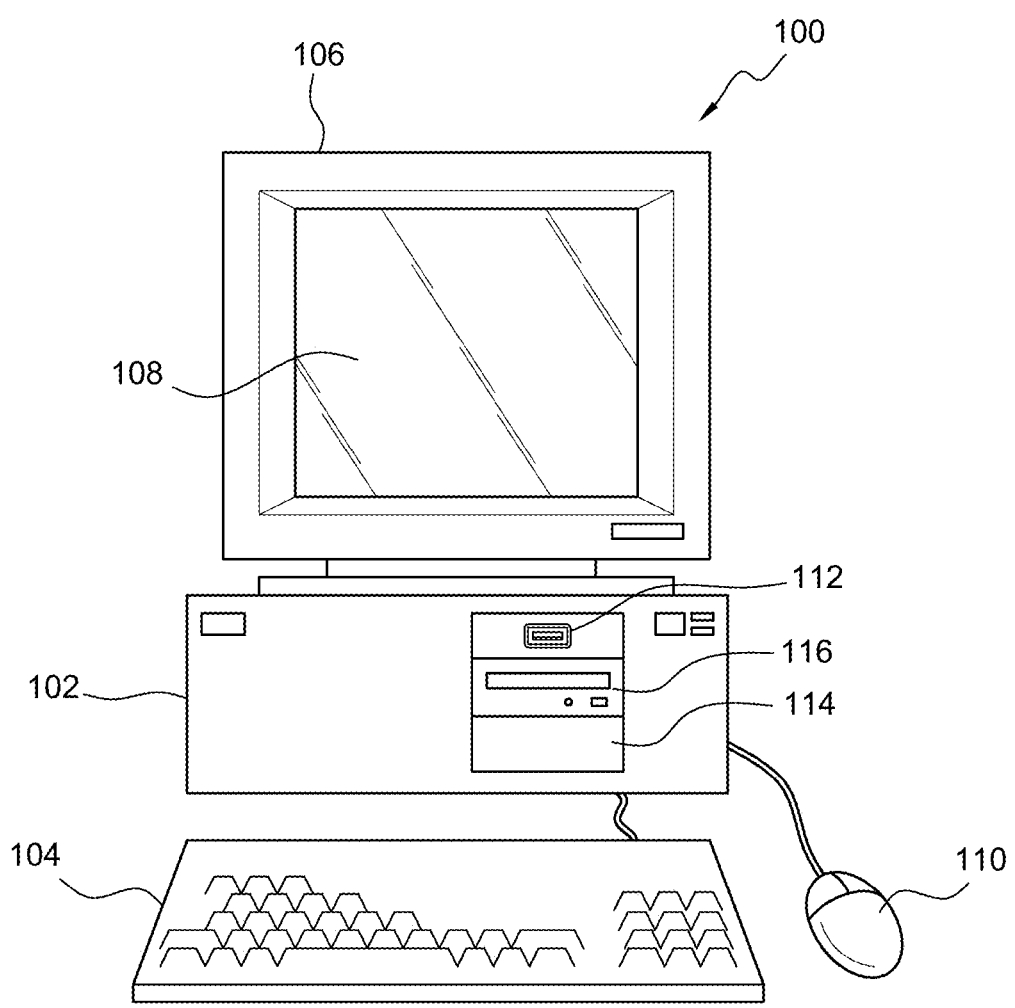
FIG. 1 illustrates a front elevational view of a computer system that is suitable for implementing various embodiments of the systems disclosed in FIGS. 3 and 6.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, two seconds, five seconds, or ten seconds.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

Embodiments of this disclosure relate to multi-dimensional event engines that are configured to auto-adjust transmission rates of message events that are communicated to one or more fulfillment centers. The multi-dimensional event engines can be incorporated into highly available and redundant network topologies to ensure continuous operations and minimize system downtime. The multi-dimensional event engine can be accessible via a cloud environment that utilizes a distributed locking mechanism to allocate control among instances of the multi-dimensional event engine. An active instance of the multi-dimensional event engine can be configured to detect a current level of network traffic, and to select a transmission rate for sending the message events to the one or more fulfillment centers based on the detected level of network traffic. The transmission rate can be dynamically adjusted in response to detecting changes in the network traffic, and additional message events can be sent using the dynamically adjusted transmission rate.

Figure 2:
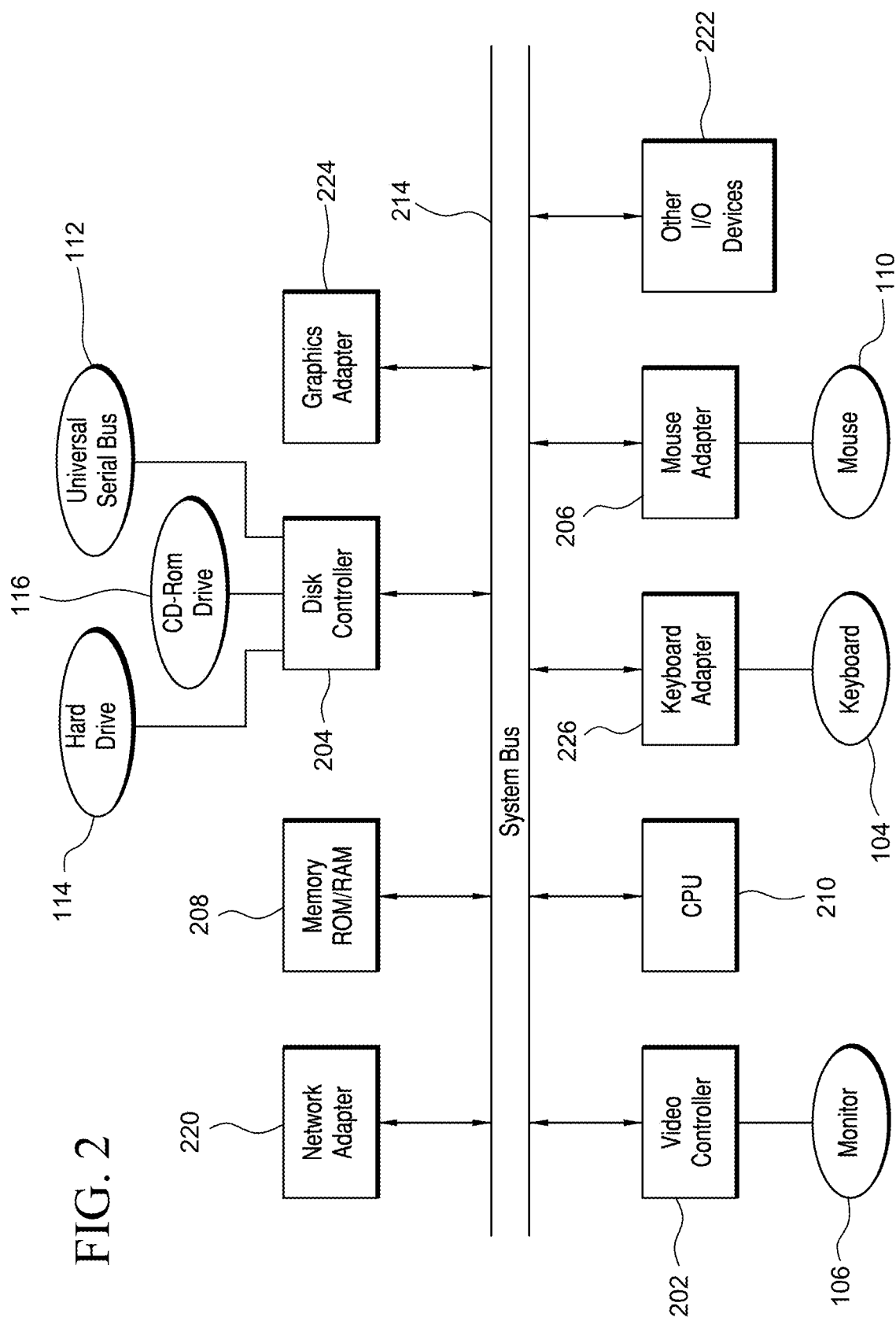
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) non-volatile memory, such as, for example, read only memory (ROM) and/or (ii) volatile memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. In these or other embodiments, memory storage unit 208 can comprise (i) non-transitory memory and/or (ii) transitory memory.

In various examples, portions of the memory storage module(s) of the various embodiments disclosed herein (e.g., portions of the non-volatile memory storage module (s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX® OS, and (iv) Linux® OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif., United States of America, (v) the Windows Mobile™ operating system by Microsoft Corp. of Redmond, Wash., United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs. In many embodiments, an application specific integrated circuit (ASIC) can comprise one or more processors or microprocessors and/or memory blocks or memory storage.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile electronic device, such as a smartphone. In certain additional embodiments, computer system 100 may comprise an embedded system.

Figure 3:
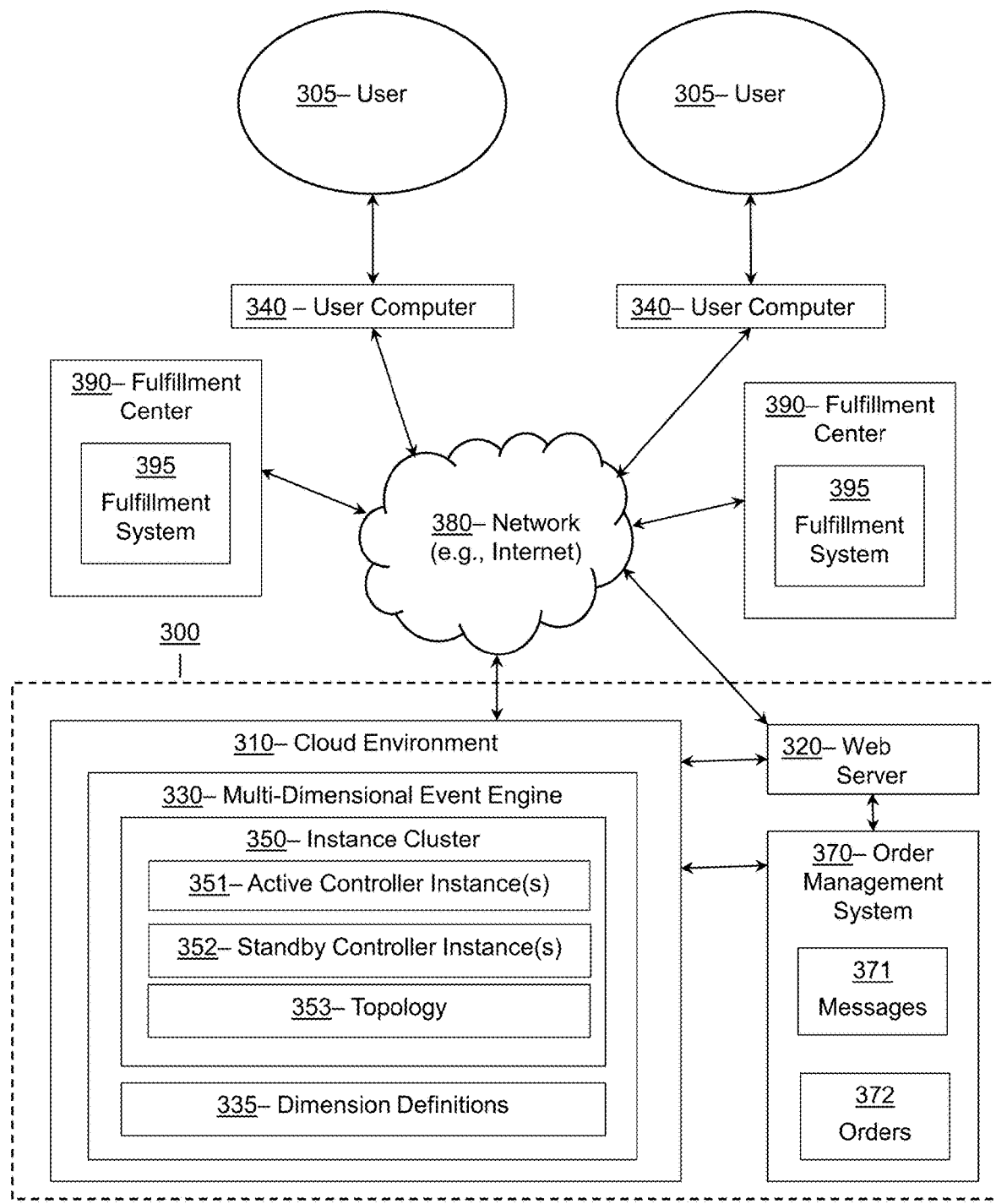
FIG. 3 illustrates a representative block diagram of a system according to certain embodiments.

Turning ahead in the drawings, FIG. 3 illustrates a block diagram of a system 300 that can be employed for efficiently processing and transmitting message events to fulfillment centers and ensuring system availability as described in greater detail below. System 300 is merely exemplary and embodiments of the system are not limited to the embodiments presented herein. System 300 can be employed in many different embodiments or examples not specifically depicted or described herein. In some embodiments, certain elements or modules of system 300 can perform various procedures, processes, and/or activities. In these or other embodiments, the procedures, processes, and/or activities can be performed by other suitable elements or modules of system 300.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In some embodiments, system 300 can include a cloud environment 310, a web server 320, a multi-dimensional event engine 330 and an order management system 370. The system 300 may also include a fulfillment center 390 and a fulfillment system 395 in certain embodiments. The cloud environment 310, the web server 320, the multi-dimensional event engine 330, the order management system 370, fulfillment center 390, and the fulfillment system 395 can each be a computer system, such as computer system 100 (FIG. 1), as described above, and can each be a single computer, a single server, or a cluster or collection of computers or servers, or a cloud of computers or servers. In another embodiment, a single computer system can host each of two or more cloud environment 310, the web server 320, the multi-dimensional event engine 330, the order management system 370, fulfillment center 390, and the fulfillment system 395 are described herein.

In many embodiments, system 300 also can comprise user computers 340. In some embodiments, user computers 340 can be mobile devices. A mobile electronic device can refer to a portable electronic device (e.g., an electronic device easily conveyable by hand by a person of average size) with the capability to present audio and/or visual data (e.g., text, images, videos, music, etc.). For example, a mobile electronic device can comprise at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile electronic device can comprise a volume and/or weight sufficiently small as to permit the mobile electronic device to be easily conveyable by hand. For examples, in some embodiments, a mobile electronic device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile electronic device can weigh less than or equal to 15.6 Newtons, 17.8 Newtons, 22.3 Newtons, 31.2 Newtons, and/or 44.5 Newtons.

Exemplary mobile electronic devices can comprise (i) an iPod®, iPhone®, iTouch®, iPad®, MacBook® or similar product by Apple Inc. of Cupertino, Calif., United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile electronic device can comprise an electronic device configured to implement one or more of (i) the iPhone® operating system by Apple Inc. of Cupertino, Calif., United States of America, (ii) the Blackberry® operating system by Research In Motion (RIM) of Waterloo, Ontario, Canada, (iii) the Palm® operating system by Palm, Inc. of Sunnyvale, Calif., United States, (iv) the Android™ operating system developed by the Open Handset Alliance, (v) the Windows Mobile™ operating system by Microsoft Corp. of Redmond, Wash., United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can comprise a mobile electronic device, and vice versa. However, a wearable user computer device does not necessarily comprise a mobile electronic device, and vice versa.

In specific examples, a wearable user computer device can comprise a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can comprise (i) Google Glass™ product or a similar product by Google Inc. of Menlo Park, Calif., United States of America; (ii) the Eye Tap™ product, the Laser Eye Tap™ product, or a similar product by ePI Lab of Toronto, Ontario, Canada, and/or (iii) the Raptyr™ product, the STAR 1200™ product, the Vuzix Smart Glasses M100™ product, or a similar product by Vuzix Corporation of Rochester, N.Y., United States of America. In other specific examples, a head mountable wearable user computer device can comprise the Virtual Retinal Display™ product, or similar product by the University of Washington of Seattle, Wash., United States of America. Meanwhile, in further specific examples, a limb mountable wearable user computer device can comprise the iWatch™ product, or similar product by Apple Inc. of Cupertino, Calif., United States of America, the Galaxy Gear or similar product of Samsung Group of Samsung Town, Seoul, South Korea, the Moto 360 product or similar product of Motorola of Schaumburg, Ill., United States of America, and/or the Zip™ product, One™ product, Flex™ product, Charge™ product, Surge™ product, or similar product by Fitbit Inc. of San Francisco, Calif., United States of America.

In some embodiments, web server 320 can be in data communication through a network 380 (e.g., the Internet) with user computers (e.g., 340). In certain embodiments, user computers 340 can be desktop computers, laptop computers, smart phones, tablet devices, and/or other endpoint devices. Web server 320 can host one or more websites. For example, web server 320 can host an online shopping website that allows users to browse and/or search for products, to add products to an electronic shopping cart, and/or to purchase products, in addition to other suitable activities.

In many embodiments, the cloud environment 310, the web server 320, the multi-dimensional event engine 330, the order management system 370, the fulfillment center 390, and the fulfillment system 395 can each comprise one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to the processing module(s) and/or the memory storage module(s) for the cloud environment 310, the web server 320, the multi-dimensional event engine 330, the order management system 370, the fulfillment center 390, and the fulfillment system 395 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processing module(s) and/or the memory storage module(s). In some embodiments, the KVM switch also can be part of the cloud environment 310, the web server 320, the multi-dimensional event engine 330, the order management system 370, the fulfillment center 390, and/or the fulfillment system 395. In a similar manner, the processing module(s) and the memory storage module(s) can be local and/or remote to each other.

In many embodiments, the cloud environment 310, the web server 320, the multi-dimensional event engine 330, the order management system 370, the fulfillment center 390, and the fulfillment system 395 can be configured to communicate with one or more user computers 340. In some embodiments, user computers 340 also can be referred to as customer computers. In some embodiments, the cloud environment 310, the web server 320, the multi-dimensional event engine 330, the order management system 370, the fulfillment center 390, and the fulfillment system 395 can communicate or interface (e.g., interact) with one or more customer computers (such as user computers 340) through a network 380, e.g., such as one that includes the Internet. Network 380 can be an intranet that is not open to the public. Accordingly, in many embodiments, the cloud environment 310, the web server 320, the multi-dimensional event engine 330, the order management system 370, the fulfillment center 390, and/or the fulfillment system 395 (and/or the software used by such systems) can refer to a back end of system 300 operated by an operator and/or administrator of system 300, and user computers 340 (and/or the software used by such systems) can refer to a front end of system 300 used by one or more users 305, respectively. In some embodiments, users 305 also can be referred to as customers, in which case, user computers 340 can be referred to as customer computers. In these or other embodiments, the operator and/or administrator of system 300 can manage system 300, the processing module(s) of system 300, and/or the memory storage module(s) of system 300 using the input device(s) and/or display device(s) of system 300.

Meanwhile, in many embodiments, the cloud environment 310, the web server 320, the multi-dimensional event engine 330, the order management system 370, the fulfillment center 390, and the fulfillment system 395 also can be configured to communicate with one or more databases. The one or more databases can comprise a product database that contains information about products, items, or SKUs (stock keeping units) sold by a retailer. The one or more databases can be stored on one or more memory storage modules (e.g., non-transitory memory storage module(s)), which can be similar or identical to the one or more memory storage module(s) (e.g., non-transitory memory storage module(s)) described above with respect to computer system 100 (FIG. 1). Also, in some embodiments, for any particular database of the one or more databases, that particular database can be stored on a single memory storage module of the memory storage module(s), and/or the non-transitory memory storage module(s) storing the one or more databases or the contents of that particular database can be spread across multiple ones of the memory storage module(s) and/or non-transitory memory storage module(s) storing the one or more databases, depending on the size of the particular database and/or the storage capacity of the memory storage module(s) and/or non-transitory memory storage module(s).

The one or more databases can each comprise a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, communication between the cloud environment 310, the web server 320, the multi-dimensional event engine 330, the order management system 370, the fulfillment center 390, and the fulfillment system 395, and/or the one or more databases can be implemented using any suitable manner of wired and/or wireless communication. Accordingly, system 300 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc.; exemplary LAN and/or WAN protocol(s) can comprise Institute of Electrical and Electronic Engineers (IEEE) 802.3 (also known as Ethernet), IEEE 802.11 (also known as WiFi), etc.; and exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.).

A number of embodiments can include a system. The system can include one or more processing modules and one or more non-transitory storage modules storing computing instructions configured to run on the one or more processing modules. The one or more storage modules can be configured to run on the one or more processing modules and perform the acts of: initiating a cluster of controller instances in a cloud environment for executing a multi-dimensional event engine that is configured to control routing of messages to one or more fulfillment centers; and configuring the cluster of controller instances in a topology that provides availability and redundancy for the multi-dimensional event engine. The topology applies a distributed lock to designate an active controller instance selected from the cluster of controller instances to be utilized as the multi-dimensional event engine. The active controller instance selected to be utilized as the multi-dimensional event engine is configured to: detect a current level of network traffic; receive the messages from an order management system; select a transmission rate for sending the messages to the one or more fulfillment centers based on the current level of the network traffic that is detected; transmit the messages to the one or more fulfillment centers in accordance with the transmission rate; dynamically adjust the transmission rate to create an adjusted transmission rate in response to detecting changes in the network traffic; and transmit additional ones of the messages to the one or more fulfillment centers in accordance with the adjusted transmission rate.

Various embodiments include a method. The method can include: initiating, with one or more processing modules, a cluster of controller instances in a cloud environment for executing a multi-dimensional event engine that is configured to control routing of messages to one or more fulfillment centers; and configuring, with the one or more processing modules, the cluster of controller instances in a topology that provides availability and redundancy for the multi-dimensional event engine. The topology applies a distributed lock to designate an active controller instance selected from the cluster of controller instances to be utilized as the multi-dimensional event engine. The active controller instance selected to be utilized as the multi-dimensional event engine is configured to: detect a current level of network traffic; receive the messages from an order management system; select a transmission rate for sending the messages to the one or more fulfillment centers based on the current level of the network traffic that is detected; transmit the messages to the one or more fulfillment centers in accordance with the transmission rate; dynamically adjust the transmission rate to create an adjusted transmission rate in response to detecting changes in the network traffic; and transmit additional ones of the messages to the one or more fulfillment centers in accordance with the adjusted transmission rate.

Various embodiments can include a system one or more processors and one or more non-transitory media storing computing instructions configured to run on the one or more processors and perform certain acts. The acts can include initiating a cluster of controller instances for executing a multi-dimensional event engine. The acts also can include configuring the cluster of controller instances in a topology. The topology can apply a distributed lock to designate an active controller instance selected from the cluster of controller instances to be utilized as the multi-dimensional event engine. After configuring the cluster of controller instances, the acts further can include executing the multi-dimensional event engine. In response to detecting changes in a current level of network traffic, the acts additionally can include dynamically adjusting a transmission rate for sending messages to one or more fulfillment centers to create an adjusted transmission rate by adjusting at least a batch size dimension indicating a threshold number of the messages for a batch. The acts also can include transmitting additional ones of the messages to the one or more fulfillment centers in accordance with the adjusted transmission rate.

A number of embodiments can include a method being implemented via execution of computing instructions configured to run on one or more processors and stored at one or more non-transitory computer-readable media. The method can include initiating a cluster of controller instances for executing a multi-dimensional event engine. The method also can include configuring the cluster of controller instances in a topology. The topology can apply a distributed lock to designate an active controller instance selected from the cluster of controller instances to be utilized as the multi-dimensional event engine. After configuring the cluster of controller instances, the method additionally can include executing the multi-dimensional event engine. In response to detecting changes in a current level of network traffic, the method further an include dynamically adjusting a transmission rate for sending messages to one or more fulfillment centers to create an adjusted transmission rate by adjusting at least a batch size dimension indicating a threshold number of the messages for a batch. The method also can include transmitting additional ones of the messages to the one or more fulfillment centers in accordance with the adjusted transmission rate.

Conventional systems for managing fulfillment centers are insufficient for many reasons. One major problem is that conventional systems fail to provide proper redundancies to ensure that the system does not go offline or become unavailable. A system failure can have catastrophic consequences, which can result in shipping delays, inaccurate inventory tracking, and various delivery problems (e.g., losing track of packages). Another major problem is that the message transmission techniques utilized by conventional systems fail to relay event information (e.g., pertaining to new orders, order cancellations, order updates, and inventory updates) to the fulfillment centers in an effective manner. Typically, the conventional systems send messages pertaining to these events to the fulfillment centers at statically defined intervals (e.g., every half hour or so). The manner in which the messages are transmitted to the fulfillment centers does not account for network traffic. Moreover, the message dispatching techniques treat high-priority messages (e.g., messages for 2-day shipping and/or messages that indicate shipments are not expected to be delivered on time) in the same manner as all of the other messages. Transmitting the messages to the fulfillment centers in this manner can result in late delivery of shipments to customers, especially at times when the messages are being transmitted to the fulfillment centers during peak hours and the fulfillment centers are receiving massive volumes of orders.

The principles described herein relate to a multi-dimensional event engine that overcomes the aforementioned problems, as well as other problems not specifically mentioned. The multi-dimensional event engine can be integrated into a cloud environment that utilizes an active-standby network topology to provide redundancy and to ensure that the multi-dimensional event engine remains operational. In the event that the multi-dimensional event engine becomes unavailable (e.g., because of a system failure, a hardware failure, and/or a software failure), a separate instance of the multi-dimensional event engine can be immediately activated to replace the failed instance. This can be accomplished, at least in part, by enforcing a distributed lock mechanism that controls which instance of the multi-dimensional event engine will be active. This configuration can ensure that the multi-dimensional event engine is highly available and that any downtime is minimized to the extent possible.

The multi-dimensional event engine also can be configured to transmit information to the fulfillment centers utilizing messaging techniques that account for network traffic levels and high-priority messages. More specifically, the multi-dimensional event engine can monitor network traffic levels and automatically adjust the transmission rate at which messages are sent to the fulfillment centers based on the current level of network traffic. The transmission rate can be increased as network traffic increases, and the transmission rate can be lowered as network traffic decreases. Adjusting the transmission rate in this manner permits the fulfillment centers to process the messages more effectively, and to ensure orders are delivered on time. In addition, prioritized messages are processed with a specialized event handler that ensures these messages are given priority and processed immediately. In certain embodiments, the specialized event handler transmits the prioritized messages to the fulfillment centers via dedicated communication channels to ensure expedited processing of these messages.

Referring back to FIG. 3, customers (e.g., users 305) can submit requests via an order management system 370. The order management system 370 can represent an electronic platform or system that is configured to process orders 372 (e.g., orders for delivering or shipping products). Customers can access the order management system 370 to place new orders 372, cancel existing orders 372, update existing orders 372, and/or perform other related functions. The order management system 370 can receive these requests via websites (e.g., an online shopping website that enables products to be purchased), via phone-based order systems, at physical store locations (e.g., where customers place orders with personnel at the store locations), and/or in other ways.

The order management system 370 generates messages 371 corresponding to each of the requests made by the customers (e.g., the requests for new orders, cancellations, updates, and/or replacements). The order management system 370 (or other system component) also can be configured to generate messages 371 associated with inventory information (e.g., messages that provide information related to inventory updates, messages that identify current inventory levels, messages that include information associated with scheduled inventory shipments, and/or messages that include other types of inventory information).

The generated messages 371 are transmitted to a multi-dimensional event engine 330 stored in a cloud environment 310. The messages 371 can be transmitted directly to the multi-dimensional event engine 330 and/or over the network 380. The multi-dimensional event engine 330 processes the messages 371 and transmits the messages 371 (e.g., via the network 380 and/or directly) to the appropriate fulfillment centers 390. As described in further detail below, the multi-dimensional event engine 330 transmits the messages 371 to the fulfillment centers 390 utilizing messaging techniques that account for varying network traffic levels, high-priority messages, and other factors. The messages 371 are received by fulfillment systems 395 located at the fulfillment centers 390.

The fulfillment centers 390 can represent any physical location (e.g., warehouse, building, storefront, and/or other structure) that assists with fulfilling orders, storing products, managing inventory, and/or delivering the products to customers (e.g., users 305). The fulfillment centers 390 can each include a fulfillment system 395. The fulfillment system 395 can include one or more computing devices (e.g., computers and/or servers) and/or software solutions that are configured to perform functions that assist the fulfillment centers 390 with processing customer requests (e.g., requests for new orders, order cancellations, order updates, replacement orders, and/or other types of requests). The fulfillment system 395 also can be configured to perform functions associated with managing, tracking, and updating inventory information. The fulfillment system 395 utilizes the messages 371 received from the multi-dimensional event engine 330 to facilitate performance of these activities. The messages 371 received from the multi-dimensional event engine 330 can include messages 371 associated with placing new orders, cancelling existing orders, updating existing orders, and/or updating inventory information.

The cloud environment 310 stores and executes a multi-dimensional event engine 330 that receives messages 371 from the order management system 370 (and/or other components), processes the messages, and transmits the messages to fulfillment centers 390. The cloud environment 310 can comprise a plurality of shared servers and server resources that are made available via the network 380. In certain embodiments, the cloud environment 310 can comprise a network of remote servers hosted on the network 380 to store, manage, and process data as described herein. In other embodiments, the cloud environment 310 can alternatively, or additionally, comprise a network of local servers that store, manage, and process data as described herein. As described in further detail below, the cloud environment 310 can execute a multi-dimensional event engine 330 that can be configured to automate processing capabilities for facilitating supply chain flows that involve processing new orders, updating existing orders, processing order cancellations, tracking and updating inventory levels, and/or performing other related activities.

The multi-dimensional event engine 330 can be implemented utilizing a topology 353 that ensures high availability and redundancy. For example, in certain embodiments, the multi-dimensional event engine 330 is implemented in an "active-standby" network topology that includes an instance cluster 350 comprising one or more active controller instances 351 and one or more standby controller instances 352. In this active-standby topology, a plurality of instances is initiated for the multi-dimensional event engine 330 in the cloud environment 310 during startup. Each instance of the multi-dimensional event engine 330 included in the instance cluster 350 tries to acquire a single distributed lock. The multi-dimensional event engine 330 can include a distributed lock manager for determining which instance is assigned the distributed lock. The instance that is assigned the distributed lock is designated as the active controller instance 351, and all of the other instances are designated as standby controller instances 352. The active controller instance 351 will serve as the multi-dimensional event engine 330 and will process all of the messages 371 received by the order management system 370 and/or other components.

The standby controller instances 352 continuously poll the distributed lock manager for the availability of the distributed lock. In the event that the active controller instance 351 crashes or otherwise becomes unavailable (e.g., due to a cloud outage in a portion of the cloud environment 310), the distributed lock will be assigned to one of the standby controller instances 352. The standby controller instance 352 that is allocated the distributed lock will then become the active controller instance 351. If the previous active controller instance 351 comes back online at some point, it will join the other standby controller instances 352 and continuously poll for availability of the distributed lock. In this manner, the topology 353 utilized to implement the multi-dimensional event engine 330 ensures high availability for the overall system and provides additional layers of redundancy.

It should be recognized that other types of topologies 353 can be utilized in connection with the principles described in this disclosure. For example, an "active-active" topology can be utilized in some cases. Regardless of which topology 353 is used, the selected topology 353 is preferably configured in a manner that ensures high availability of the multi-dimensional event engine 330 and other system components.

The manner in which the multi-dimensional event engine 330 transmits messages 371 to the fulfillment centers (e.g., to the fulfillment system 395) is unique and can provide a variety of advantages. The multi-dimensional event engine 330 controls delivery of the messages 371 across a plurality of dimensions. For example, the multi-dimensional event engine 330 can control the transmission rate of messages 371 (e.g., to change the rate during peak and off-peak hours), expedite processing of prioritized messages, and customize the transmission of messages according to various supply chain measures (e.g., by fulfillment center and/or by message type). To enable control over these dimensions, the multi-dimensional event engine 330 stores dimension definitions 335 that can be utilized to classify messages and to specify how routing of the messages 371 is accomplished. More specifically, metadata included in the messages 371 is compared to the dimension definitions 335 and the multi-dimensional event engine 330 determines how the messages 371 should be dispatched to the fulfillment centers 390 based on this comparison.

In certain embodiments, a first set of base dimensions included in the dimension definitions 335 can be used to control the transmission rate of the messages 371. A second set of priority dimensions included in the dimension definitions 335 can be utilized to enable advanced flow control for prioritized messages. A third set of supply chain dimensions included in the dimension definitions 335 can be utilized to control the flow of messages 371 for certain types of supply chains and/or to account for certain logistical measures. Each of these is described in further detail below.

In certain embodiments, the first set of base dimensions used to control the transmission rate of the messages 371 includes a time dimension indicating a time period (e.g., 2 minutes or 30 minutes) and a batch size dimension indicating a threshold number of messages 371. The time period can be set to any time period (e.g., 1 second, 1 minute, 10 minutes, 1 hour, 1 day, etc.), and the batch size dimension can be set to any positive integer value (e.g., 10, 100, 1,000, 5,000, etc.). The multi-dimensional event engine 330 will transmit a batch of messages to one or more of the fulfillment centers 390 whenever the time period expires or whenever the threshold number of messages 371 is reached, whichever occurs first. Thus, adjusting the parameters associated with the time dimension and the batch size dimension can be utilized to adjust the rate at which messages 371 are communicated to the fulfillment centers 390.

In certain embodiments, the multi-dimensional event engine 330 detects the current level of network traffic. The current level of network traffic can be determined by monitoring the volume of messages 371 that are being submitted via the order management system 370, monitoring the volume of messages 371 that are being received by the multi-dimensional event engine 330, monitoring the number of users 305 accessing the order management system 370, and/or monitoring other similar metrics. The transmission rate of the multi-dimensional event engine 330 is automatically adjusted based on the detected network traffic. In certain embodiments, the transmission rate can be increased in response to detecting increasing levels of network traffic, and can be decreased in response to detecting lower levels of network traffic. This dynamic adjustment of the transmission rates permits the fulfillment centers to process the messages 371 more effectively and to ensure that deliveries are shipped on time, while accounting for varying volumes of messages 371 during peak hours and off-peak hours. This represents an improvement upon conventional techniques, which typically send the messages 371 at static, pre-defined intervals, thus resulting in the occurrence of backlogs during peak hours.

The second set of priority dimensions, which can be utilized to provide advanced flow control for prioritized messages, can utilize parameters that indicate whether or not a message 371 is to be treated as a prioritized message. Messages 371 can be prioritized for a variety of different reasons. For example, the second set of priority dimensions can include an expedited shipping dimension that indicates whether an order 372 is subject to expedited shipping preferences (e.g., 2-day shipping or same-day shipping). The second set of priority dimensions can also include an anomaly dimension that indicates shipping exceptions have been detected for an order (e.g., when the system 300 detects that an order 372 will not be delivered within an expected timeframe or that products have been damaged). The expedited shipping and anomaly dimensions include parameters that indicate whether a message 371 should be subject to prioritized treatment. If the metadata included in a message 371 indicates that the message is a prioritized message (or such is detected by the multi-dimensional event engine 330), the dimension definitions 335 will identify these message 371 as one which requires special treatment and the message 371 will be processed by a specialized handler incorporated into the multi-dimensional event engine 330. The specialized handler can cause prioritized messages to be sent to the fulfillment centers 390 at higher transmission rates than other messages that are not prioritized. The specialized handler also can cause prioritized messages to be sent to the fulfillment system 395 of a fulfillment center 390 via a separate, prioritized communication channel. This can involve sending the prioritized messages to computer devices, inboxes, message queues, and/or individuals which are dedicated to expedite processing of the messages at the fulfillment centers 390.

The third set of supply chain dimensions is utilized to customize and control the flow of messages 371 for certain types of supply chains and/or to account for certain logistical measures. The supply chain dimensions can include a message type dimension that includes a parameter that identifies the supply chain or process flow associated with the message 371. For example, the message type dimension can identify whether a message 371 is associated with a supply chain or process flow for a new order, an order cancellation, an inventory update, an order modification, an order replacement, and/or another type of event. The supply chain dimensions also can include a facility identifier dimension that identifies which fulfillment center 390 should receive the message 371 pertaining to an order 372 and/or fulfill the order 372 associated with the message 371. The supply chain dimensions can further include a facility type dimension that includes a parameter that identifies a type of facility that is processing the order 372. For example, the facility type dimension can determine whether or not the facility utilizes automated equipment to sort, package, and/or otherwise facilitate the delivery of orders 372. The type of equipment available at a fulfillment center 390 can affect whether or not a package is to be routed to the fulfillment center 390.

The third set of supply chain dimensions may be utilized to customize and control the flow of messages 371 to the fulfillment centers 390. For example, these dimensions can be utilized to aggregate the messages for different supply chains in different groupings for transmission, and/or to route the messages for different supply chains to appropriate channels of the fulfillment system 395 for processing.

As mentioned above, the multi-dimensional event engine 330 stores dimension definitions 335 that are utilized to process the messages 371. The dimension definitions 335 can represent programming objects, code instructions, and/or scripts that are utilized to identify and categorize the messages 371 and to route the messages to the fulfillment centers 390 based on the parameters specified in the dimension definitions 335 (e.g., the parameters that define the transmission rates, prioritized message handling, and customized supply chain handling). Metadata included in the messages 371 is compared to the dimension definitions 335 to determine how messages 371 are to be routed to the fulfillment centers 390. Exemplary dimension definitions 335 are described below to demonstrate how this is accomplished.

Example 1 (below) includes pseudocode for defining an exemplary dimension definition 335 that is utilized to identify and route messages 371 associated with new orders 372.

Example 1

```
{
    "duration" : "10 min",
    "message_count" : "1000",
    "process_type" : "OrderRequest",
    "partnerId" : "6559"
}
```

The "process_type" parameter is set to "OrderRequest" to specify that this dimension definition 335 applies to messages 371 pertaining to new orders. The parameter can alternatively identify other types of supply chains or process flows (e.g., dealing with order cancellations or inventory updates). The first two parameters (i.e., "duration" and "message_count") define base dimensions that control the transmission rate of the messages that fall within the scope of this dimension definition 335. For example, the parameters specify that a batch of messages will be transmitted to a fulfillment center 390 every 10 minutes or upon receiving 1,000 messages for new orders, whichever occurs first. As mentioned above, these values can be adjusted based on peak and non-peak levels to modify the transmission rate. The "partnerId" parameter identifies a specific fulfillment center 390 associated with fulfilling the new orders (e.g., a specific fulfillment center 390 that is designated to process and fulfill the order).

When messages 371 are received by the multi-dimensional event engine 330, metadata included in the messages 371 will be compared to a plurality of dimension definitions 335, such as the example provided above, to determine how the messages 371 should be dispatched. If the metadata of a message 371 matches the parameters for a dimension definition 335 (e.g., matches the "process_type" and "partnerId" parameters), then the message 371 will be routed in accordance with the parameters of the dimension definition 335 (e.g., the messages will be dispatched according to the transmission rate and to the identified fulfillment center 390).

Examples 2 and 3 (below) include pseudocode for defining two exemplary dimension definitions 335 that are utilized to identify and route messages 371 associated with new orders that should be prioritized.

Example 2

```
{
    "duration" : "2 min",
    "message_count" : "100",
    "priority" : HIGH;
    "process_type" : "OrderRequest",
    "partnerId" : "6559"
}
```

Example 3

```
{
    "duration" : "5 min",
    "message_count" : "200",
    "is_anomalous" : true;
    "process_type" : "OrderRequest",
    "partnerId" : "6559"
}
```

Each of these examples includes an additional parameter that is not included in Example 1. Specifically, the first dimension definition 335 includes a "priority" parameter for identifying messages that are marked as high priority (e.g., because they require expedited shipping), and the second dimension includes an "is_anomalous" parameter for identifying messages 371 that should be prioritized because the metadata in the message indicates the presence of shipping exceptions (e.g., indicates an order will be delivered late, an order was lost, an order requires a replacement, etc.). It should be noted that the transmission rates in Examples 2 and 3 are higher than the transmission rate in Example 1 because the dimension definitions 335 in Examples 2 and 3 are utilized to expedite processing of messages that are deemed to be high-priority. Messages 371 that have metadata matching the above dimension definitions 335 can be transmitted via a dedicated communication channel (e.g., to a dedicated computer, inbox, message queue, or individual) to expedite processing of the orders associated with the messages 371.

Examples 4 and 5 (below) include pseudocode for defining two exemplary dimension definitions 335 that are utilized to identify and route messages 371 associated with order cancellations and inventory updates, respectively. This is accomplished by modifying the "process_type" parameter as shown below.

Example 4

```
{
    "duration" : "15 min",
    "message_count" : "500",
    "process_type" : "OrderCancel",
    "partnerId" : "6559"
}
```

Example 5

```
{
    "duration" : "5 min",
    "message_count" : "200",
    "process_type" : "Inventory",
    "partnerId" : "6559"
}
```

It should be recognized that Examples 1-5 provided above are merely intended to illustrate exemplary dimension definitions 335 that can be utilized to identify and route messages 371 received by the multi-dimensional event engine 330 to fulfillment centers 390. The parameters can be modified accordingly to adjust the transmission rate, to identify other fulfillment centers 390, to identify other supply chains, and/or for other reasons. Additional parameters can be added to the dimension definitions 335 as well (e.g., to include a facility type parameter as described above and/or other types of parameters).

As evidenced by the disclosure herein, the principles set forth in this disclosure are rooted in computer technologies that overcome existing problems in fulfillment systems, specifically problems dealing with providing a highly available and redundant network topology for an event engine that is configured to forward message events to fulfillment systems. The principles also are rooted in computer technologies that overcome problems associated with effectively dispatching the message events to fulfillment centers. In known fulfillment systems, messages are sent to fulfillment centers at static intervals (e.g., every half hour), and those systems fail to provide proper redundancies to ensure the system does not experience downtime. The principles described in this disclosure provide a technical solution (e.g., one that utilizes an active-standby network topology with a distributed locking mechanism that can ensure high availability and redundancy, and one that enables dynamic adjustment of transmission rates to fulfillment centers based on detected network traffic) for overcoming such problems.

This technology-based solution marks an improvement over existing computing capabilities and functionalities related to fulfillment systems by eliminating (or at least minimizing) system downtime and automatically adjusting transmission rates to fulfillment centers to allow for more effective and efficient processing of the messages. These systems are designed to improve the way fulfillment systems process orders, maintain inventories, and ensure continuous operations.

Figure 4:
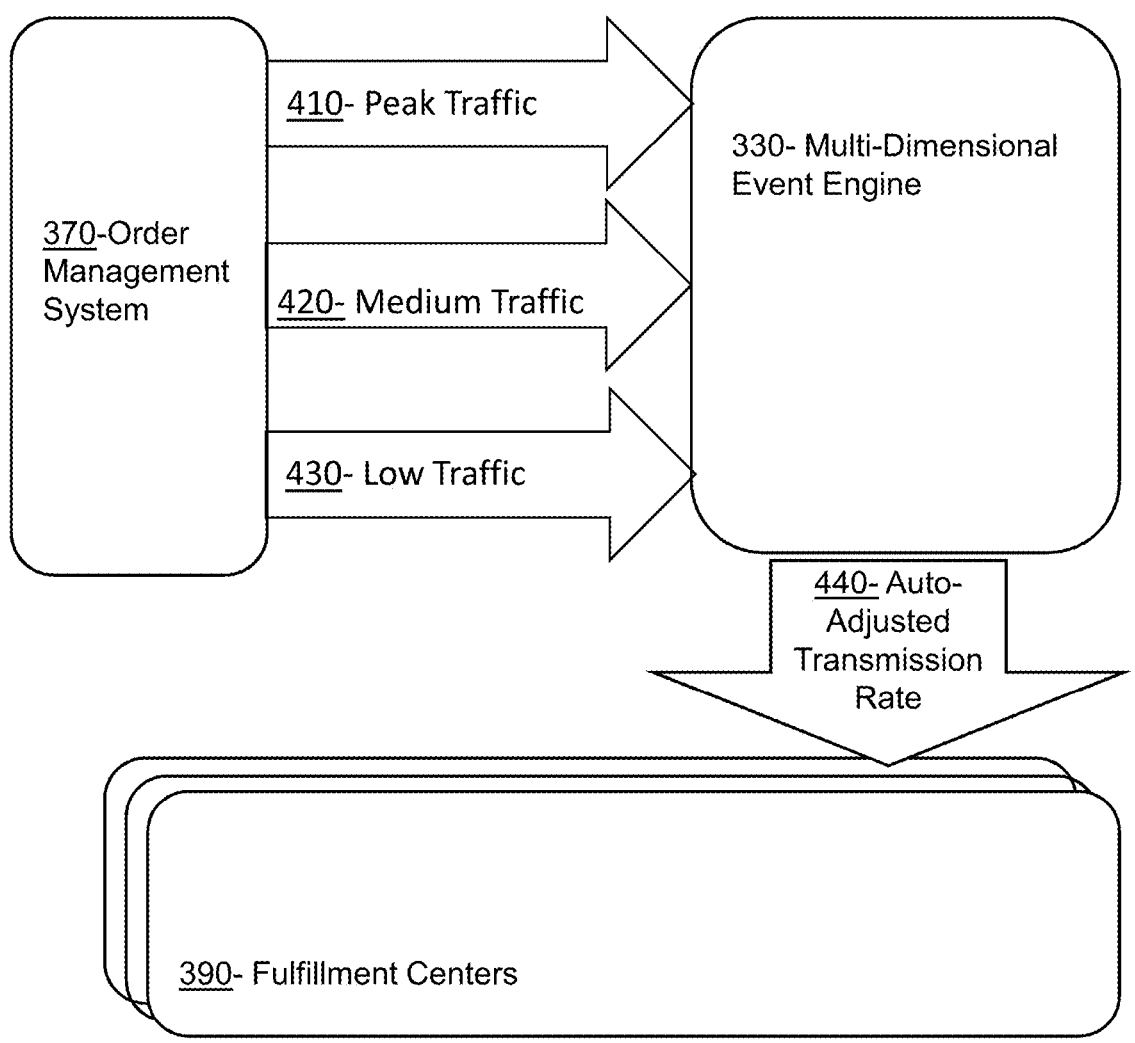
FIG. 4 is a sequence diagram illustrating a process flow for auto-adjusting transmission rates according to certain embodiments.

FIG. 4 is a sequence diagram 400 that illustrates how the multi-dimensional event engine 330 can automatically adjust transmission rates for sending messages 371 (FIG. 3) to fulfillment centers 390. An order management system 370 transmits messages 371 (FIG. 3) to the multi-dimensional event engine 330. The messages 371 (FIG. 3) can pertain to requests for new orders, order cancellations, and/or order modifications that are submitted by customers (e.g., users 305 in FIG. 3). The messages 371 (FIG. 3) also can pertain to inventory updates (e.g., which identify current levels of available inventory, scheduled inventory shipments to the fulfillment centers, or any other information related to inventory).

The messages 371 (FIG. 3) can be transmitted to the multi-dimensional event engine 330 during times of peak traffic 410, medium traffic 420, or low traffic 430. The multi-dimensional event engine 330 is configured to detect when the network (e.g., network 380 in FIG. 3) is experiencing peak traffic 410, medium traffic 420, and low traffic 430. In certain embodiments, the determination of whether the network is experiencing peak traffic 410, medium traffic 420, or low traffic 430 can be based on the volume of messages 371 (FIG. 3) that are being received by the order management system 370 within a specified period of time. For example, the multi-dimensional event engine 330 can store threshold information for determining whether the volume of messages 371 (FIG. 3) constitutes peak traffic 410, medium traffic 420, or low traffic 430. The determination of whether the network is experiencing peak traffic 410, medium traffic 420, or low traffic 430 can be made in other ways as well.

The multi-dimensional event engine 330 transmits the messages 371 (FIG. 3) to the appropriate fulfillment centers 390 according to an auto-adjusted transmission rate 440 that accounts for the level of network traffic. For example, messages 371 (FIG. 3) can be transmitted at a highest transmission rate during periods of peak traffic 410, a lower transmission rate during periods of medium traffic 420, and a lowest transmission rate during periods of low traffic 430. Transmitting the messages 371 in this manner permits fulfillment centers 390 to process the messages more efficiently and to avoid late deliveries.

In certain embodiments, in order to modify the transmission rate, the multi-dimensional event engine 330 can adjust parameter settings associated with the dimension definitions (e.g., by adjusting the parameters for the time and batch size dimensions mentioned above). Alternatively, or additionally, the auto-adjusted transmission rate 440 can be modified by selecting separate sets of dimension definitions 335 (FIGS. 3 & 6) to be used during peak traffic 410, medium traffic 420, and low traffic 430. The separate sets of dimension definitions 335 (FIGS. 3 & 6) can include varying settings for transmission rates based on the varying levels of traffic.

Turning ahead in the drawings, FIG. 5 illustrates a flow chart for a method 500 according to certain embodiments. Method 500 is merely exemplary and is not limited to the embodiments presented herein. Method 500 can be employed in many different embodiments or examples not specifically depicted or described herein. In some embodiments, the activities of method 500 can be performed in the order presented. In other embodiments, the activities of method 500 can be performed in any suitable order. In still other embodiments, one or more of the activities of method 500 can be combined or skipped. In many embodiments, system 300 (FIG. 3) can be suitable to perform method 500 and/or one or more of the activities of method 500. In these or other embodiments, one or more of the activities of method 500 can be implemented as one or more computer instructions configured to run at one or more processing modules 601, 603, 605 (FIG. 6) of cloud environment 310 (FIGS. 3 & 6), order management system 370 (FIGS. 3, 4 & 6), and fulfillment center 390 (FIGS. 3 & 6), respectively, and configured to be stored at one or more non-transitory memory storage modules 602, 604, 606 (FIG. 6) of cloud environment 310 (FIGS. 3 & 6), order management system 370 (FIGS. 3, 4 & 6), and fulfillment center 390 (FIGS. 3 & 6), respectively. The processing module(s) can be similar or identical to the processing module(s) described above with respect to computer system 100 (FIG. 1).

Method 500 can comprise an activity 510 of detecting a current level of network traffic. As explained above, the multi-dimensional event engine 330 can be configured to determine whether the network 380 (FIG. 3), the system 300 (FIG. 3), and/or the order management system 370 (FIGS. 3, 4, & 6) are currently experiencing peak traffic 410 (FIG. 4), medium traffic 420 (FIG. 4), or low traffic 430 (FIG. 4) levels. The network traffic can be based, at least in part, on the volume or number of messages 371 (FIGS. 3 & 6) that are being received and/or transmitted by either the order management system 370 (FIGS. 3, 4, & 6) and/or the multi-dimensional event engine 330 (FIGS. 3, 4, & 6).

Figure 6:
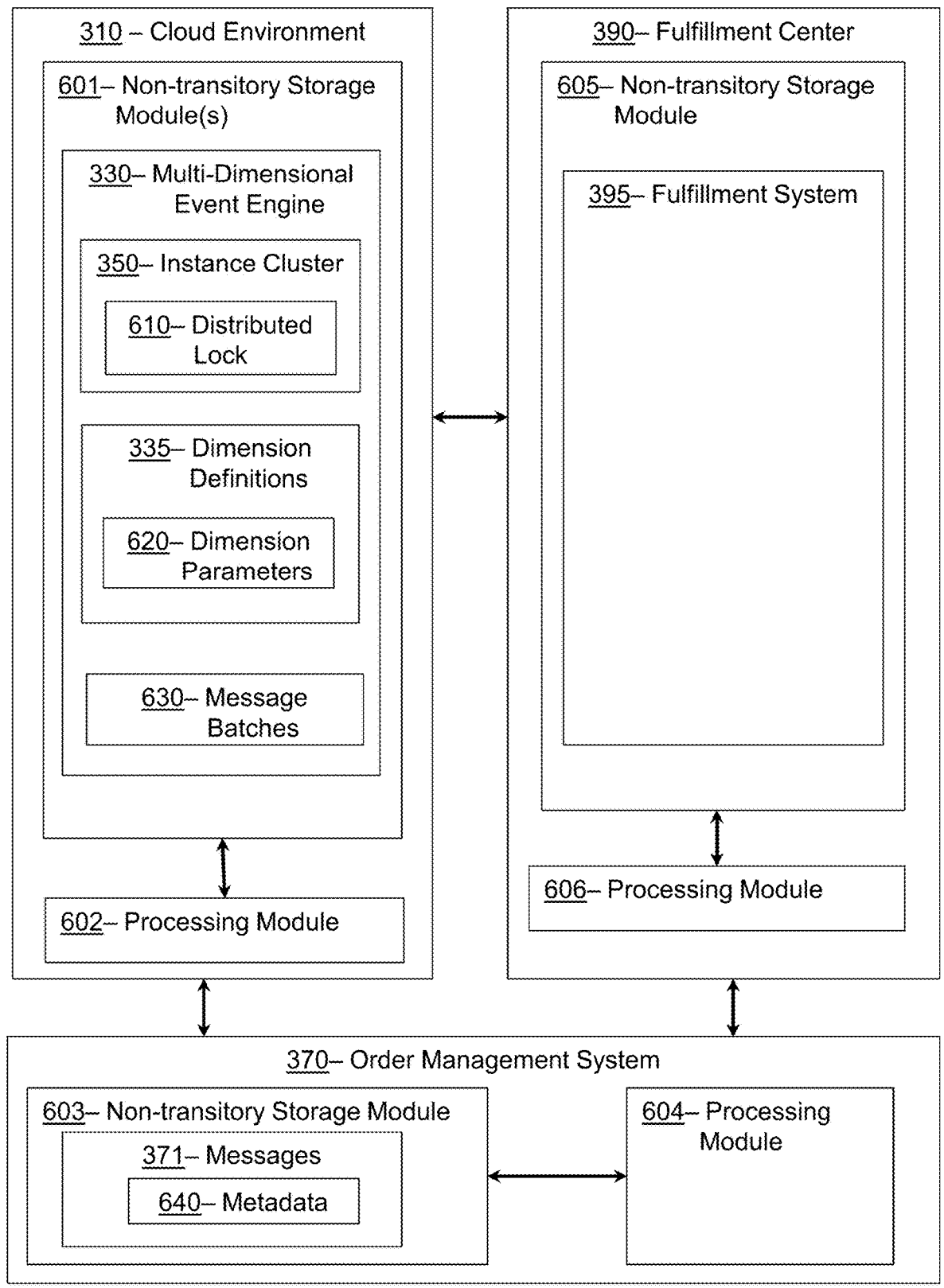
FIG. 6 illustrates a representative block diagram of a portion of the system of FIG. 3 according to certain embodiments.

Method 500 can further comprise an activity 520 of receiving messages 371 (FIGS. 3 & 6) from an order management system 370 (FIGS. 3, 4, & 6). As explained above, the multi-dimensional event engine 330 (FIGS. 3, 4, & 6) can receive messages 371 (FIGS. 3 & 6) associated with customer requests (e.g., requests to place new orders, cancel existing orders, and/or modify existing orders) and/or messages pertaining to inventory (e.g., messages that include updated inventory information). The messages 371 (FIGS. 3 & 6) can be transmitted by the order management system 370 (FIGS. 3, 4, & 6) and/or other system components.

Method 500 can further comprise an activity 530 of selecting a transmission rate for sending the messages 371 (FIGS. 3 & 6) to one or more fulfillment centers 390 (FIGS. 3, 4, & 6) based on the current level of network traffic that is detected. The transmission rate can be defined utilizing the dimension definitions 335 (FIGS. 3 & 6) described above. Greater transmission rates are selected to handle greater levels of network traffic, and lower transmission rates are utilized to handle lower levels of network traffic. The transmission rates can be granularly customized according to the specific traffic level that is detected (e.g., using a function that granularly adjust the transmission rate based on the specific traffic conditions currently detected) and/or can be tiered to adjust the transmission rate when certain threshold levels of traffic are detected (e.g., incrementally adjusted when certain threshold traffic levels are detected).

Method 500 can further comprise an activity 540 of transmitting the messages to the fulfillment centers in accordance with the transmission rate that is selected. The messages can also be transmitted in accordance with priority dimensions and/or supply chain dimensions described above. The messages can be transmitted via the network 380

(FIG. 3) and/or directly to the fulfillment centers. The messages can be received by the fulfillment systems at the fulfillment centers.

Method 500 can further comprise an activity 550 of dynamically adjusting the transmission rate in response to detecting changes in the network traffic. As explained above, the multi-dimensional event engine 330 (FIGS. 3, 4, & 6) transmits messages 371 (FIGS. 3 & 6) to the one or more fulfillment centers 390 (FIGS. 3, 4, & 6) based on an auto-adjusted transmission rate 440 (FIG. 4) that accounts for the network traffic. In certain embodiments, the auto-adjusted transmission rate 440 (FIG. 4) is increased in response to detecting an increased level of network traffic, and is decreased in response to detecting a decreased level of network traffic. The messages are thereafter transmitted to the fulfillment centers in accordance with the adjusted transmission rate.

FIG. 6 illustrates a block diagram of a portion of system 300 comprising the cloud environment 310, multi-dimensional event engine 330, order management system 370, fulfillment center 390, and fulfillment system 395 in FIG. 3 according to certain embodiments. Each of cloud environment 310, multi-dimensional event engine 330, order management system 370, fulfillment center 390, and fulfillment system 395 is merely exemplary and not limited to the embodiments presented herein. Each of cloud environment 310, multi-dimensional event engine 330, order management system 370, fulfillment center 390, and fulfillment system 395 can be employed in many different embodiments or examples not specifically depicted or described herein. In some embodiments, certain elements or modules of cloud environment 310, multi-dimensional event engine 330, order management system 370, fulfillment center 390, and fulfillment system 395 can perform various procedures, processes, and/or acts. In other embodiments, the procedures, processes, and/or acts can be performed by other suitable elements or modules.

As explained above, the multi-dimensional event engine 330 can be implemented using a topology 353 (FIG. 3) that is highly available and that provides redundancy. For example, in certain embodiments, the multi-dimensional event engine 330 can be implemented in an active-standby topology that includes an instance cluster 350 that comprises one or more active controller instances 351 (FIG. 3) and one or more standby controller instances 352 (FIG. 3). A distributed lock 610 is utilized to control which instance included in the instance cluster 350 is designated as an active controller instance 351 (FIG. 3). In response to the active controller instance 351 (FIG. 3) becoming unavailable, the distributed lock 610 is allocated to one of the standby controller instances 352 (FIG. 3), which thereafter becomes an active controller instance 351 (FIG. 3). This topology 353 (FIG. 3) minimizes downtime of the multi-dimensional event engine 330.

The multi-dimensional event engine 330 stores dimension definitions 335. Each of the dimension definitions 335 can include one or more dimension parameters 620. Exemplary dimension parameters 620 can include the parameters discussed above, which are utilized to specify transmission rates (e.g., the time and batch size parameters), to identify prioritized messages (e.g., the expedited shipping parameters and/or anomalous event parameters), and/or to enable customized flows for supply chains and logistical measures (e.g., the message type, facility identifier, and facility type parameters).

The messages 371 received by the multi-dimensional event engine 330 include metadata 640. The metadata 640 included in the messages 371 can include fields that correspond to one or more of the parameter dimensions 620 included in the dimension definitions 335. For example, the metadata 640 can include information that identifies whether the message 371 is a high-priority message (e.g., because of expedited shipping obligations and/or anomalous events). The metadata 640 can further include information that identifies the fulfillment center 390 and/or the fulfillment system 395 that should receive the message 371. The metadata 640 can further include information that identifies the message type (e.g., which indicates whether the message should be processed using a supply chain for new orders, order cancellations, inventory updates, etc.).

The multi-dimensional event engine 330 utilizes the dimension parameters 620 and the metadata 640 to route messages 371 to appropriate fulfillment centers 390. The multi-dimensional event engine 330 aggregates the messages into message batches 630 based on this comparison (e.g., based on the message type and based on the fulfillment center) and periodically transmits the message batches 630 to the fulfillment centers 390. The message batches 630 are transmitted based on the dimension parameters 620 specified in the dimension definitions 335. As explained above, the multi-dimensional event engine 330 can automatically adjust the transmission rates based on the level of network traffic.

Although systems and methods have been described with reference to specific embodiments, it will be understood by those skilled in the art that various changes can be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-6 can be modified, and that the foregoing discussion of certain of these embodiments does not necessarily represent a complete description of all possible embodiments. For example, one or more of the procedures, processes, or activities of FIG. 5 can include different procedures, processes, and/or activities and be performed by many different modules, in many different orders.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are, or potentially are, equivalents of express elements and/or limitations in the claims under the doctrine of equivalents.

What is claimed is:
1. A system comprising:
one or more processors; and
one or more non-transitory media storing computing instructions configured to run on the one or more processors and perform:

initiating a cluster of controller instances for executing a multi-dimensional event engine;
configuring the cluster of controller instances in a topology, wherein the topology applies a distributed lock to designate an active controller instance selected from the cluster of controller instances to be utilized as the multi-dimensional event engine, wherein the active controller instance, as selected, is configured to:
  detect a current level of network traffic;
  receive messages from an order management system;
  select a transmission rate for sending the messages to one or more fulfillment centers based on the current level of the network traffic that is detected and based on a set of base dimensions comprising (i) a time dimension indicating a time period and (ii) a batch size dimension; and
  transmit the messages to the one or more fulfillment centers in accordance with the transmission rate; and
in response to detecting changes in the current level of the network traffic, dynamically adjusting the transmission rate for sending the messages to the one or more fulfillment centers to create an adjusted transmission rate by adjusting at least the batch size dimension indicating a threshold number of the messages for a batch.

2. The system of claim 1,
wherein the active controller instance, as selected, for the multi-dimensional event engine aggregates the messages and transmits the batch of the messages to the one or more fulfillment centers in response to the time period expiring or in response to the threshold number of the messages being exceeded; and
wherein the computing instructions are further configured to perform:
  transmitting additional ones of the messages to the one or more fulfillment centers in accordance with the adjusted transmission rate.

3. The system of claim 1, wherein dynamically adjusting the transmission rate causes a frequency at which the batch of the messages is transmitted to the one or more fulfillment centers to be adjusted.

4. The system of claim 1, wherein:
the active controller instance, as selected, to be utilized as the multi-dimensional event engine is further configured to monitor the current level of the network traffic; and
dynamically adjusting the transmission rate comprises:
  automatically increasing the transmission rate in response to detecting an increasing level of the network traffic; or
  automatically decreasing the transmission rate in response to detecting a decreasing level of the network traffic.

5. The system of claim 1, wherein:
the active controller instance, as selected, of the multi-dimensional event engine stores dimension definitions, wherein the dimension definitions are configured to detect prioritized ones of the messages, and wherein the prioritized ones of the messages comprise:
  first prioritized ones of the messages associated with orders that require prioritized shipping; and
  second prioritized ones of the messages associated with anomalous orders or shipping exceptions,
  wherein each of the first prioritized ones of the messages is transmitted to the one or more fulfillment centers on a dedicated communication channel to expedite processing of the first prioritized ones of the messages.

6. The system of claim 1, wherein:
the multi-dimensional event engine stores dimension definitions that comprise logistics information for identifying supply chains and designated fulfillment centers of the one or more fulfillment centers associated with the messages; and
the logistics information is utilized by the multi-dimensional event engine to aggregate and route the messages to the one or more fulfillment centers.

7. The system of claim 1, wherein:
the active controller instance, as selected, to be utilized as the multi-dimensional event engine is further configured to:
  compare metadata included in the messages received from the order management system to dimension definitions stored by the multi-dimensional event engine;
  aggregate the messages into groupings according to the dimension definitions; and
  transmit batches of the messages to the one or more fulfillment centers based on the groupings.

8. The system of claim 1, wherein:
controller instances of the cluster of controller instances that are not designated to be the active controller instance are selected to be utilized as standby controller instances;
the standby controller instances are continuously polling a distributed lock manager to check an availability of the distributed lock; and
in response to the active controller instance becoming unavailable, one of the standby controller instances is selected to be utilized as the active controller instance using the distributed lock.

9. The system of claim 8, wherein the topology is an active-standby topology.

10. The system of claim 1, wherein the messages received from the order management system comprise:
  messages associated with order requests;
  messages associated with order cancellations; or
  messages associated with inventory updates.

11. A method being implemented via execution of computing instructions configured to run on one or more processors and stored at one or more non-transitory computer-readable media, the method comprising:
  initiating a cluster of controller instances for executing a multi-dimensional event engine;
  configuring the cluster of controller instances in a topology, wherein the topology applies a distributed lock to designate an active controller instance selected from the cluster of controller instances to be utilized as the multi-dimensional event engine, wherein the active controller instance, as selected, is configured to:
    detect a current level of network traffic;
    receive messages from an order management system;
    select a transmission rate for sending the messages to one or more fulfillment centers based on the current level of the network traffic that is detected and based on a set of base dimensions comprising (i) a time dimension indicating a time period and (ii) a batch size dimension; and
    transmit the messages to the one or more fulfillment centers in accordance with the transmission rate; and in response to detecting changes in the current level of the network traffic, dynamically adjusting the transmission rate for sending the messages to the one or more fulfillment centers to create an adjusted transmission rate by adjusting at least the batch size dimension indicating a threshold number of the messages for a batch.

12. The method of claim 11, wherein:
wherein the active controller instance, as selected, for the multi-dimensional event engine aggregates the messages and transmits the batch of the messages to the one or more fulfillment centers in response to the time period expiring or in response to the threshold number of the messages being exceeded; and
wherein the computing instructions are further configured to perform:
   transmitting additional ones of the messages to the one or more fulfillment centers in accordance with the adjusted transmission rate.

13. The method of claim 11, wherein dynamically adjusting the transmission rate causes a frequency at which the batch of the messages is transmitted to the one or more fulfillment centers to be adjusted.

14. The method of claim 11, wherein:
the active controller instance, as selected, to be utilized as the multi-dimensional event engine is further configured to monitor the current level of the network traffic; and
dynamically adjusting the transmission rate comprises:
   automatically increasing the transmission rate in response to detecting an increasing level of the network traffic; or
   automatically decreasing the transmission rate in response to detecting a decreasing level of the network traffic.

15. The method of claim 11, wherein:
the active controller instance, as selected, of the multi-dimensional event engine stores dimension definitions, wherein the dimension definitions are configured to detect prioritized ones of the messages, and wherein the prioritized ones of the messages comprise:
   first prioritized ones of the messages associated with orders that require prioritized shipping; and
   second prioritized ones of the messages associated with anomalous orders or shipping exceptions,
wherein each of the first prioritized ones of the messages is transmitted to the one or more fulfillment centers on a dedicated communication channel to expedite processing of the first prioritized ones of the messages.

16. The method of claim 11, wherein:
the multi-dimensional event engine stores dimension definitions that comprise logistics information for identifying supply chains and designated fulfillment centers of the one or more fulfillment centers associated with the messages; and
the logistics information is utilized by the multi-dimensional event engine to aggregate and route the messages to the one or more fulfillment centers.

17. The method of claim 11, wherein:
the active controller instance, as selected, to be utilized as the multi-dimensional event engine is further configured to:
   compare metadata included in the messages received from the order management system to dimension definitions stored by the multi-dimensional event engine;
   aggregate the messages into groupings according to the dimension definitions; and
   transmit batches of the messages to the one or more fulfillment centers based on the groupings.

18. The method of claim 11, wherein:
controller instances of the cluster of controller instances that are not designated to be the active controller instance are selected to be utilized as standby controller instances;
the standby controller instances are continuously polling a distributed lock manager to check an availability of the distributed lock; and
in response to the active controller instance becoming unavailable, one of the standby controller instances is selected to be utilized as the active controller instance using the distributed lock.

19. The method of claim 18, wherein the topology is an active-standby topology.

20. The method of claim 11, wherein the messages received from the order management system comprise:
   messages associated with order requests;
   messages associated with order cancellations; or
   messages associated with inventory updates.

* * * * *